United States Patent [19]
Johnson

[11] 4,245,816
[45] Jan. 20, 1981

[54] FLOW FORCE BALANCED SPOOL VALVE

[75] Inventor: Howard L. Johnson, Joliet, Ill.

[73] Assignee: Caterpillar Tractor Co., Peoria, Ill.

[21] Appl. No.: 897,894

[22] Filed: Apr. 19, 1978

[51] Int. Cl.³ .............................................. F16K 39/04
[52] U.S. Cl. ................................. 251/282; 137/625.3; 251/205
[58] Field of Search .................. 251/282, 205, 206; 137/625.3, 625.69

[56] References Cited

U.S. PATENT DOCUMENTS

| | | | |
|---|---|---|---|
| 3,009,480 | 11/1961 | Miller | 137/625.69 |
| 3,160,174 | 12/1964 | Schmiel et al. | 137/625.69 |
| 3,534,774 | 10/1970 | Tennis | 137/625.69 |
| 3,556,155 | 1/1971 | McWilliams | 251/205 |
| 3,747,642 | 7/1973 | Tolbert, Jr. | 137/625.3 |
| 4,009,864 | 3/1977 | Schexnayder | 137/625.3 |
| 4,066,239 | 1/1978 | Hall | 137/625.3 |
| 4,122,867 | 10/1978 | Zagotta | 137/625.3 |
| 4,122,868 | 10/1978 | Holloway et al. | 137/625.69 |
| 4,126,155 | 11/1978 | Bertram | 251/282 |

Primary Examiner—William R. Cline
Assistant Examiner—H. Jay Spiegel
Attorney, Agent, or Firm—Wegner, Stellman, McCord, Wiles & Wood

[57] ABSTRACT

A spool valve including a valve body having a bore intercepted by at least two axially spaced ports and a spool reciprocally received within the bore and having two axially spaced lands separated by a groove, one side wall of the groove being adjacent one of the lands and defining a shoulder. At least one shallow metering slot is disposed in the other of the lands and opens to the groove through another side wall thereof opposite from the first mentioned side wall. The slot has an increasing depth in the direction toward the groove and a cross sectional area taken transversely to the axis of the spool at any point along the slot less than the area of the top of the slot from the point to the end of the slot remote from the groove. An additional slot is disposed in the shoulder and opens to the groove, has a ramp-like bottom, and a width different from that of the metering slot.

4 Claims, 4 Drawing Figures

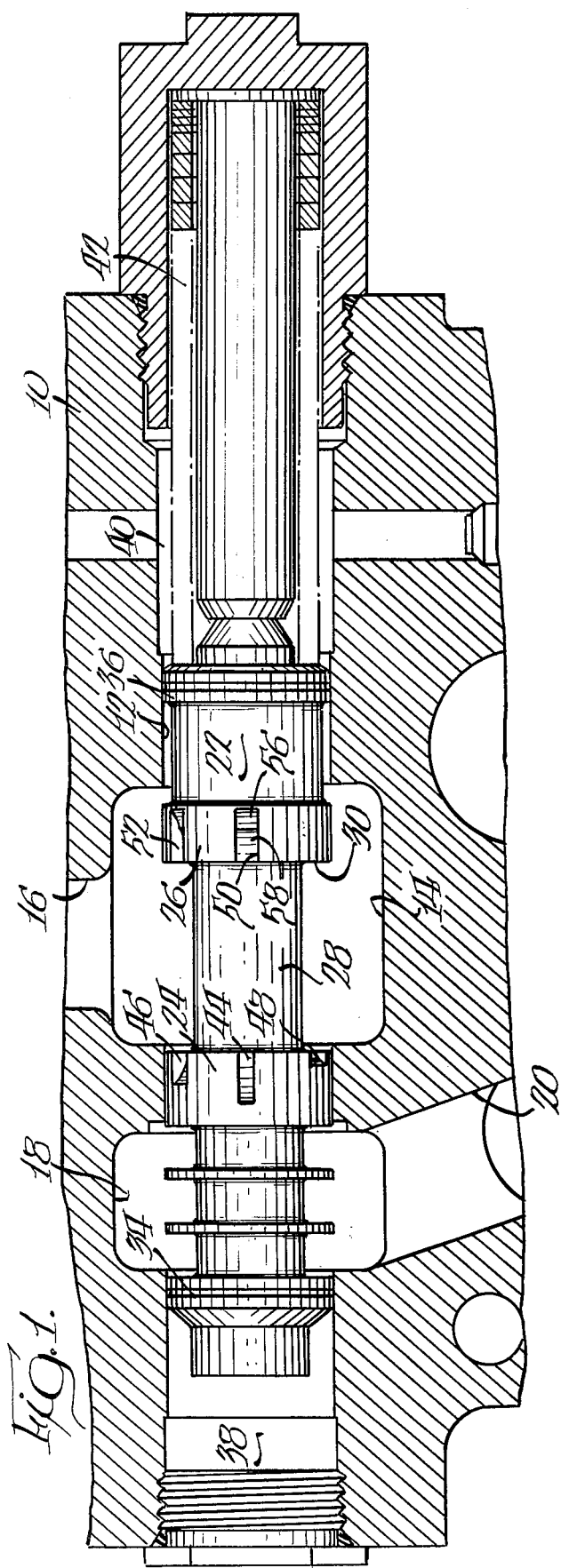
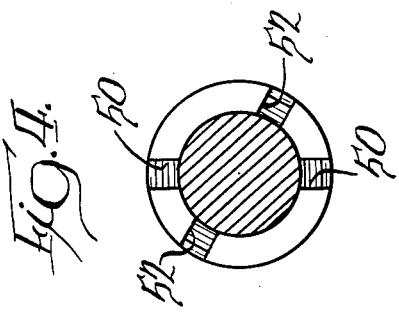
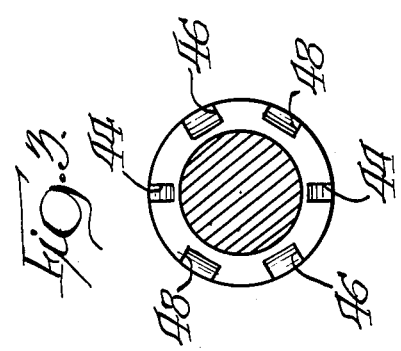
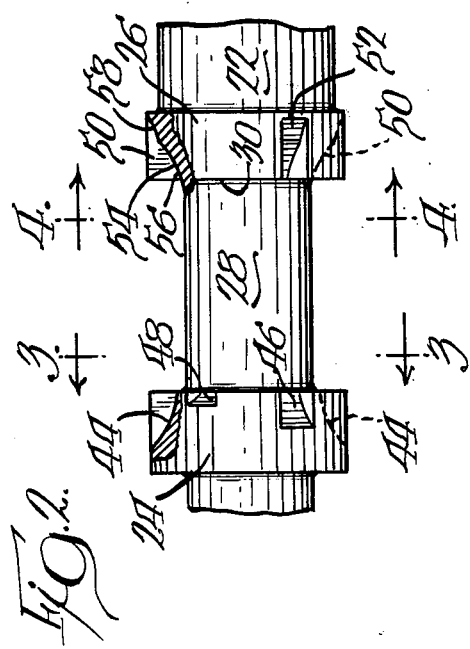

FLOW FORCE BALANCED SPOOL VALVE

BACKGROUND OF THE INVENTION

This invention relates to spool valves and, more specifically, to a spool valve provided with means whereby the action of flow forces is generally constant and/or balanced for any degree of opening of the valve.

The existence of flow forces in spool valves and their effects has long been recognized. Depending upon the particular valve construction, the flow pattern therethrough, and the pressures involved, flow forces may tend to oppose an operator opening the valve or act in concert therewith at widely varying values dependent upon spool travel. In many instances, for one position of the spool, the flow force may oppose the operator while in another position of the spool, it may aid the operator.

Consequently, precise control of the flow of fluid may be difficult to achieve to the desired degree because spool position will not be solely determined by a control force provided by an operator for the valve. For when the flow force is assisting the operator force, the total force operating on the spool will be greater than that provided by the operator alone and the total force may vary according to spool position. The same is true when the flow forces are acting in opposition to the operator force and, of course, when flow forces can act both in concert and in opposition to the operator force, dependent upon spool travel, accurate placement of the spool through operator force at all positions along the path of travel of the spool becomes exceedingly difficult to attain. Therefore, there is a real need for a spool valve wherein flow forces are substantially balanced and/or constant throughout the operating parameters of the valve.

SUMMARY OF THE INVENTION

The present invention is directed to overcoming one or more of the above problems.

According to the present invention, there is provided a spool valve having a valve body with a bore intercepted by at least two axially spaced ports. A spool is reciprocally received within the bore and has two axially spaced lands separated by a groove, one side wall of the groove being adjacent one of the lands and defining a shoulder.

According to one aspect of the invention, there are provided a plurality of metering slots in the other land which open to the groove through the side wall thereof opposite from the first mentioned side wall. The axial length of at least two of the slots measured from the side wall opposite from the shoulder is different. Consequently, the slots open at different points during the travel of the spool within the bore to provide a means for balancing the flow forces. At least one additional slot is located in the shoulder and is aligned with and faces one of the metering slots.

According to another aspect of the invention, there is provided at least one shallow metering slot in the other of the lands, as identified above, which opens to the groove through the side wall opposite the shoulder. The slot has an increasing depth in the direction toward the groove and a cross sectional area taken transversely to the axis of the spool at any point along the slot less than the area of the top of the slot from that point to the end of the slot remote from the groove. Again, an additional slot is disposed in the shoulder and opens to the groove. The additional slot preferably has a ramp-like bottom and a width different from that of the metering slot.

Other objects and advantages will become apparent from the following specification taken in connection with the accompanying drawings.

DESCRIPTION OF THE DRAWINGS

FIG. 1 is a fragmentary, sectional view of a spool valve embodying the invention;

FIG. 2 is a fragmentary view of part of the spool of the spool valve with parts broken away for clarity;

FIG. 3 is a sectional view taken approximately along the line 3—3 of FIG. 2; and FIG. 4 is a sectional view taken approximately along the line 4—4 of FIG. 3.

DESCRIPTION OF THE PREFERRED EMBODIMENT

An exemplary embodiment of a spool valve made according to the invention is illustrated in FIG. 1 and is seen to include a valve body 10 having a bore 12 therein. A first annulus or port 14 intercepts the bore 12 and is in fluid communication with an outlet conduit 16 through which fluid received in the annulus 14 may be directed to a point of use or to reservoir.

Axially spaced along the length of the bore 12 from the annulus 14 is an annulus 18 which also intercepts the bore 12 and which is in fluid communication with a conduit 20 which will receive fluid to be metered by the valve.

Reciprocally received within the bore 12 is a spool 22. The spool 22 includes axially spaced lands 24 and 26 which are separated by a groove 28. A side wall 30 of the groove 28 is adjacent the land 26 and defines a shoulder that is rather abrupt in nature. As seen in FIG. 1, the side wall 30 defining the shoulder is in a plane transverse (90°) to the longitudinal axis of the spool 22 and, for reasons to be seen, it is preferred that there be at least 90° between the side wall 30 and the longitudinal axis of the spool 22 measured on the side of the side wall 30 occupied by the land 26.

The spool 22, adjacent its opposite ends, includes seal bearing lands 34 and 36 such that the ends of the bore 12 define pressure chambers 38 and 40, respectively. Fluid under pressure may be directed to either one of the chambers 38 and 40 in any of a variety of known ways. For example, when the valve is employed as a flow control valve, a conduit (not shown) will connect the annulus 14 to the chamber 38 while the chamber 40 will be connected to the downstream side of the usual main spool valve (not shown) employed in a typical system. The chamber 40 is also occupied by a spring 42 which abuts the right-hand end of the spool 22 to bias the same towards the left, as viewed in FIG. 1. In other words, the spring 42 provides a valve opening force.

The land 24 is provided with a plurality of metering slots 44, 46 and 48 which open to the groove 28. As best seen in FIG. 3, in actuality, there are two of the slots 44 diametrically opposed about the land 24, two of the slots 46, also diametrically opposed, and two of the slots 48. The slots 48 are also diametrically opposed and adjacent ones of the slots 44–48 are spaced angularly by about 60°.

In a highly preferred embodiment, at least the slots 44 and 46 are relatively shallow so that metering will occur through an opening which is transverse to the longitudinal axis of the spool 22 and not through an opening lying in a surface of a cylinder concentric to that longitudinal axis. In other words, the cross sectional area of each of the slots 44 and 46 taken transversely to the longitudinal axis of the spool at any point along the length of the slot will be less than the area of the top of the slot (that part of the slot that would fall within the surface of the land 24 if the slot was not present) from the particular point chosen to the end of the slot remote from the groove 28.

It will also be observed that all of the slots 44–48 have an increasing depth in the direction toward the groove 28.

When the spool 22 is shifted to the left, as viewed in FIG. 1, the slots 44 will first come into fluid communication with the annulus 18. Further leftward movement will bring the slots 46 into such fluid communication as well. Finally, additional leftward movement will bring the slots 48 into such fluid communication.

It will also be observed that as to at least the slots 44 and 46, that because of the above-described shallow nature of the same, the smallest opening in the flow path from the annulus 18 through the slots 44 and 46 to the annulus 14, will lie in a plane transverse to the longitudinal axis of the spool 22 with the consequence that an emanating jet of fluid will be directed generally parallel to the longitudinal axis of the spool 22 toward the land 26.

The land 26 is provided with additional slots 50 and 52. The slots 50 are aligned with the metering slots 44, while the slots 52 are aligned with the slots 46 and the same open through the shoulder defined by the side wall 30 towards the aligned metering slots. The slots 50 and 52 provide exiting ramps for the jet streams of fluid emanating from the slots 44 and 46 into the annulus 14. The bottoms of the slots 50 and 52 are designated 54 and are generally planar in a plane nonparallel to the longitudinal axis of the spool 22. Because as a practical matter, the formation of perfectly planar bottoms 54 is difficult, and, therefore, expensive, they may be formed of two or more arcuate sections 56 and 58 (FIG. 2) as would result from two cuttings utilizing, for example, a Woodruff key cutter such that the centers of the surfaces 56 and 58 are spaced.

As can be seen from a comparison of FIGS. 3 and 4, the widths of at least some of the metering slots, such as the metering slots 44, differ from the widths of the corresponding, aligned, additional slots such as the slots 50. For example, as illustrated in the drawings, the additional slots 50 are wider than the aligned metering slots 44. In general, such dimensioning is desirable but instances will occur where the metering slots and the additional slots aligned therewith will have the same width. And, in some instances, the additional slots may have a lesser width than the aligned metering slots. Relative width selection can be based on desired characteristics by those skilled in the art with the knowledge of how the width affects operation, as will be described.

In a typical prior art spool valve utilizing metering slots, the loading of the spring and the pressure drop across the metering orifice affect the total forces applied to the spool. As a spring, such as the spring 42 extends, the spring force will fall off at a substantially linear rate. The pressure drop across the metering orifice will also change. As the metering orifice opens, the pressure drop will become smaller, although not in proportion to the size of the metering orifice. For example, the pressure drop may stay relatively constant over a spool travel providing partial flow to a point whereat full flow begins to occur. Thereafter, full flow may be maintained while the pressure will drop.

In a valve made according to the invention, as the valve 22 is moved towards the left, as viewed in FIG. 1, the metering slots 44 will first be cracked and a large pressure drop will occur, with the consequence that a very high velocity jet stream of fluid will be directed substantially parallel to the longitudinal axis of the spool 22. Because of the smallness of the orifice, the width of the jet stream will be relatively small and the entire stream may exit into the annulus 14 through the additional slot 50. Because of the inclination of the bottom 54 of the slot 50, very little force will be exerted against the land 26 due to the stream of fluid at this time. Consequently, flow forces will be essentially those provided by the reaction of the fluid entering the slot 44 from the annulus 18 as a reactive force against the bottom of the slot 44. This force will aid that supplied by the spring 42.

As more and more of the metering slot 44 is exposed, the metering orifice will increase in size, with the consequence that the jet stream of fluid emanating therefrom will become wider and a portion thereof will begin to impinge on the shoulder defined by the groove side 30. As a result, a force will be generated caused by fluid striking the shoulder 30, which force will be in opposition to that provided by the spring 42 and which will counterbalance an increasing flow force caused by the reaction of fluid against the bottom of the metering slot 44 so that the net force due to flow forces remain substantially constant.

By providing a series of slots, such as the slots 44, 46 and 48, all having differing axial lengths, the ability to balance flow forces at a variety of differing spool positions is achieved. The width of the additional slots 50 and 52 affects the degree to which a force opposing the spring 40 is generated by fluid impinging upon the shoulder 30. The wider the additional slots 50 and 52, the less spring opposing force is generated by such impingement.

A spool valve made according to the invention balances flow forces. When made with a plurality of slots having differing axial lengths, the ability to achieve such a balance over an extremely wide range of spool positions is provided.

It will also be recognized that by pairing slots of equal axial length on opposite sides of the spool, equal forces will be present on both sides thereof to prevent any tendency of the spool 22 to cant and bind.

If desired, the shoulder 30 may be formed with a negative angle to provide a greater barrier for fluid emanating from the metering slots where a greater spring opposing force is desired. And, by varying the widths of the additional slots 50 and 52, the effectiveness of the shoulder 30 as a barrier can be controlled to achieve any desired characteristic in a valve.

Finally, as used herein, the term "slot" is not rerestricted to configurations such as those illustrated in the drawings, but may include, by way of example, drilled passages, grooves, etc.

The embodiments of the invention in which an exclusive property or privilege is claimed are defined as follows:

1. A spool valve comprising:
   a valve body having a bore intercepted by at least two axially spaced ports;
   a spool reciprocally received within said bore and having two axially spaced lands separated by a groove, one side wall of said groove being adjacent one of said lands and defining a shoulder;

at least one shallow metering slot in the other of said lands and opening directly into and above the base of said groove through another side wall thereof opposite said one side wall, said slot having an increasing depth in the direction toward said groove and a cross sectional area taken transversely to the axis of said spool at any point along said slot less than the area of the top of the slot from said any point to the end of the slot remote from said groove to cause high velocity fluid metered by said metering slot to flow substantially parallel to the axis of the spool as it is being metered; and an additional slot in said one land and said shoulder opening to said groove in alignment with said metering slot, having a ramp-like bottom extending from said groove one side wall to the top of said one land, and having a width greater than that of said metering slot.

2. The spool valve of claim 1 wherein said shoulder is a surface at at least about 90° to the longitudinal axis of said spool measured from the side thereof including said one land.

3. The spool valve of claim 1 wherein said bottom is approximately planar and defined by at least two arcuate machined cuts having different centers.

4. The spool valve of claim 1 wherein there are a plurality of said metering slots in said other land and opening to said groove through said another side wall, the axial lengths in said other land of at least two of said metering slots measured from said another side wall being different from one another.

* * * * *